Patented May 10, 1938

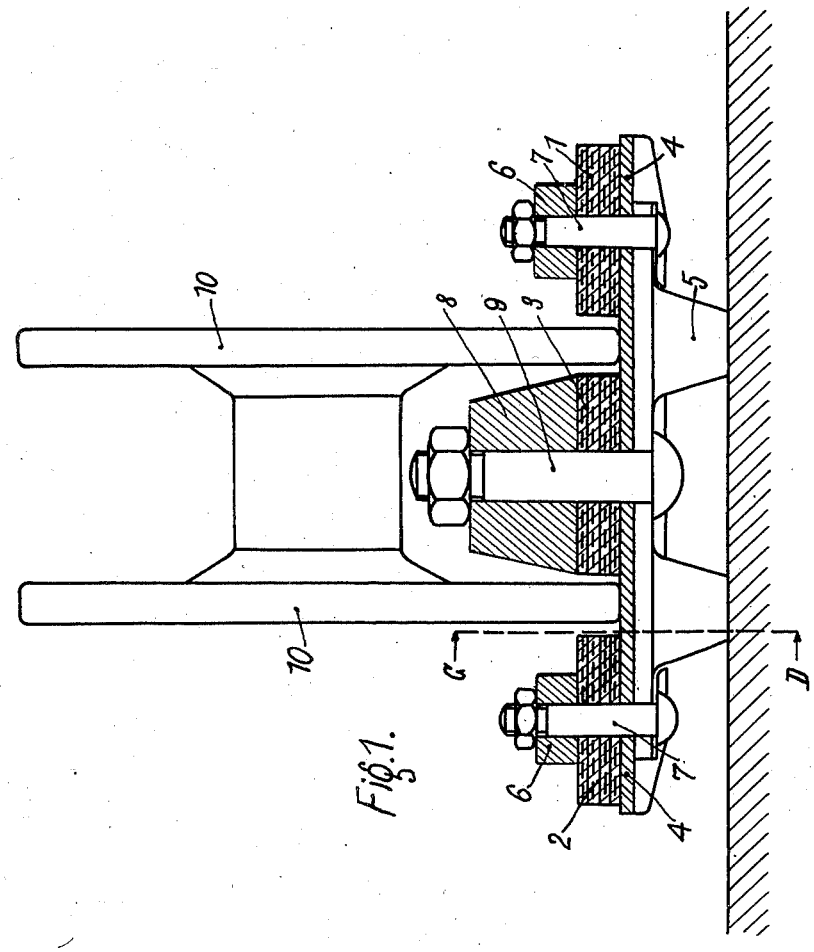

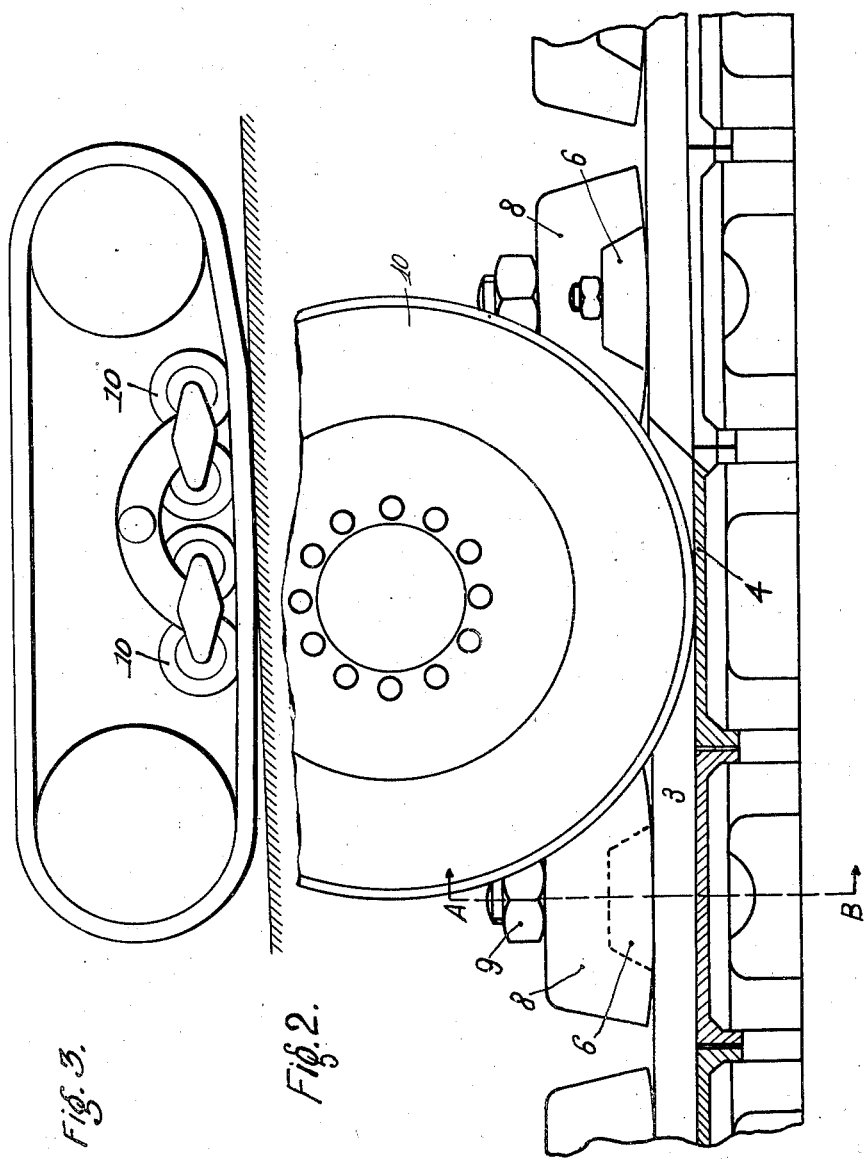

2,116,834

UNITED STATES PATENT OFFICE 2,116,834

ENDLESS TRACK FOR VEHICLES

Adolphe Kégresse, Paris, France

Application February 10, 1936, Serial No. 63,266
In France February 13, 1935

2 Claims. (Cl. 305—10)

The French patent specification No. 667,701 discloses endless tracks for motor vehicles constituted by two parallel belts, allowing the carrying rollers to pass between them.

Numerous tests made with this kind of endless track have failed to give the expected results.

Due to its construction, this endless track does not make it possible to utilize a guide of flexible material, which necessitates larger dimensions than metal guiding, as provided in the aforesaid patent specification, and consequently reduces the width of the endless tracks by the same amount and hence their strength.

On the other hand, metal guiding does not adapt itself well to the high speeds of the metal rollers; there is premature wear and prohibitive noise.

Furthermore, the rollers rolling directly on the metal plates assembled together solely by means of the bolts of the driving teeth caused the latter to be subjected, on bad ground, to excessive stresses, resulting in fracture.

The object of the present invention is to provide a new type of endless track which remedies the above-mentioned disadvantages.

The features of the invention will be well understood from the accompanying drawings and the following description.

In these drawings:

Figure 1 is a section of the track according to the invention on the line A—B of Figure 2.

Figure 2 is a view thereof partly in elevation and partly in section on the line C—D of Figure 1.

Figure 3 shows the whole of the endless track diagrammatically.

As will be seen from the figures, the endless track according to the present invention is composed of three independent and parallel belts 1, 2 and 3 (Figure 1) leaving between them a certain space. These three belts are assembled on metal plates 4 (Figure 1) mounted so as to touch each other, on the outer belts 1 and 2. These plates may be provided with track blocks 5 of resilient material.

The aggregate constituted by the metal plates and track blocks is moreover already known.

The outer belts 1 and 2 are provided, in known manner, with driving teeth 6 (Figure 1) permanently fixed by means of bolts 7 which assemble together the track blocks 5, the metal plates 4, the belts 1 and 2 and the driving teeth 6.

The central belt 3 is provided with guide projections 8. The bolts 9 assemble these guide projections, the belt 3, the metal plates 4 and the track blocks 5.

The space provided beween the belts 1 and 3, and 2 and 3, serves as rolling track for rollers 10. Thus, as will be seen, these rollers roll on a metal rolling track. They are guided by the central belt 3 and also by the guide projections 8, the base of which has the same width as the central belt 3.

The disadvantages referred to hereinbefore will thus be eliminated. It will be appreciated in fact that, in the device according to the invention, guiding may be ensured by resilient materials which are hence not subject to binding and noise, irrespective of the speed at which the rollers run. Furthermore, it will be seen that the work of dislocation of the track elements is absorbed not only by the relatively fragile driving teeth 6 and their bolts 7 but also by the guide projections 8, the dimension of which is greater than that of the driving teeth, and their fixing bolts 9, likewise more robust than those employed for fixing the driving teeth.

As the guide projections have to be made of much larger dimensions than the driving teeth, it will be readily appreciated that the track elements will therefore be less liable to dislocation than in the case of the above-mentioned patent specification No. 667,701.

Furthermore, the addition of the central belt 3 lightens the work of the outer belts 1 and 2.

Another point to be considered is that, with this device it is possible to distribute the load on the metal plates more judiciously by placing the rollers further apart, without reducing the strength of the track. It will in fact be seen that, although the spacing of the rollers is effected to the detriment of the width of the outer belts 1 and 2, it will on the contrary provide the possibility of widening the central belt 3 by the same amount, so that the total strength of the track will not be diminished.

The rollers, in bearing on a larger base, will diminish the stresses on the metal plate and will enable the latter to be made of lighter construction. It will be readily appreciated that this point is of very great importance for high speeds, since the effects of the centrifugal force are obviously less appreciable on a light plate than on a heavy plate.

The incontestable advantage afforded by widely spaced rollers from the point of view of the guiding should also be considered. In fact, when guiding is effected by means of a thin central part, it is seen that if one of the edges of the track abuts against an obstacle, a stone for example, the track will have every facility to twist, thus making guiding very difficult. If the rollers are very widely spaced, the torsion of the track on passing over the same obstacle will become so to speak impossible and guiding will necessarily be better.

I claim:—

1. Flexible endless track mechanism for motor vehicles, comprising a pair of parallel endless bands, transverse metal plates connected to said bands, double rimmed guide rollers rolling on said plates between said bands, a third endless band centrally arranged between the endless bands of said pair, said third endless band being continuous and flexible and arranged with its edges between the rims of said rollers to form guides for the rims of said rollers, and elastic blocks on the central band, said blocks extending between the rims of the rollers.

2. Flexible endless track mechanism for motor vehicles, comprising a pair of parallel endless bands, transverse metal plates connected to said bands, double rimmed guide rollers rolling on said plates between said bands, a third endless band centrally arranged between the endless bands of said pair, said third endless band being continuous and flexible and arranged with its edges between the rims of said rollers to form guides for the rims of said rollers, elastic blocks on the central band, said blocks extending between the rims of the rollers, and bolts uniting said blocks with the central band and the metal plates.

ADOLPHE KÉGRESSE.